Dec. 25, 1945.   F. J. DEVER   2,391,397
BEVERAGE MAKER
Filed June 5, 1944

Inventor
Franklin J. Dever,

Patented Dec. 25, 1945

2,391,397

UNITED STATES PATENT OFFICE 2,391,397

BEVERAGE MAKER

Franklin J. Dever, Columbus, Ohio

Application June 5, 1944, Serial No. 538,745

4 Claims. (Cl. 99—320)

The present invention relates to new and useful improvements in devices for making tea, coffee and similar beverages, and the invention has for its primary object to provide a float including a foraminous portion adapted to contain the grounds or similarly prepared particles of the tea or coffee and adapted for placing in a vessel within which the beverage is being made whereby the action of water boiling in the vessel will cause an agitation of the float so that the contents thereof will become thoroughly and quickly subjected to the influence of the boiling water.

A further important object of the invention is to provide a measuring attachment forming part of the float.

A still further object is to provide an article of this character of simple and practical construction, which is efficient and reliable in use, relatively inexpensive to manufacture, and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which:

Figure 1:
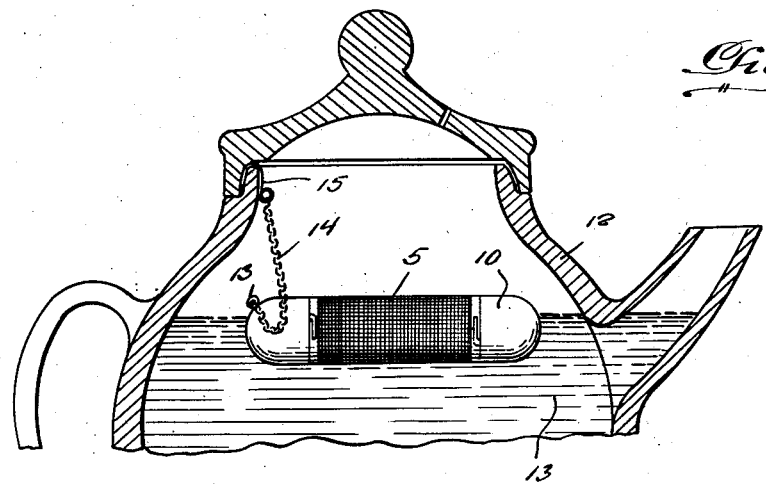
Figure 1 is a fragmentary sectional view of a beverage making vessel showing the float in position therein.
Figure 2:
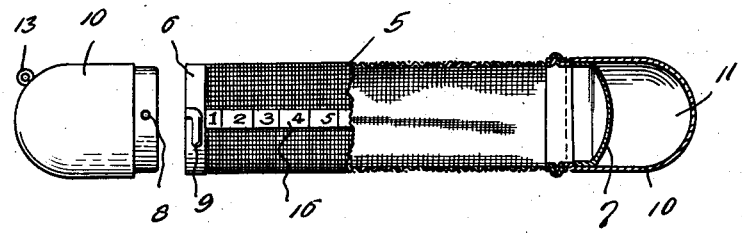
Fig. 2 is a side elevational view of the float with parts broken away and shown in section.
Figure 3:
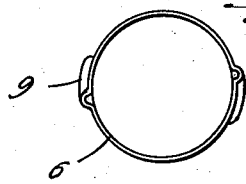
Fig. 3 is an end elevational view of the foraminous tube connecting the ends of the float.
Figure 4:
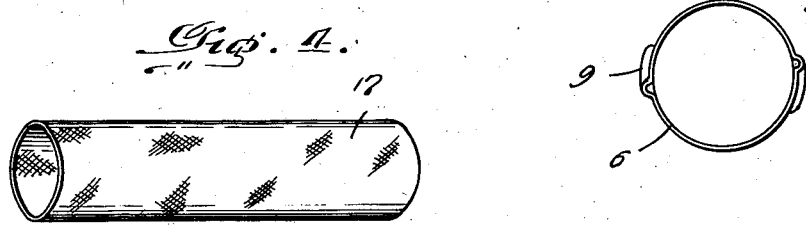
Fig. 4 is a perspective view of a tubular filter adapted for positioning in the foraminous member.

Referring now to the drawing in detail and first with respect to the form of invention illustrated in Figs. 1 to 4 inclusive the numeral 5 designates a tubular member having side walls of fine mesh wire screen or other suitable foraminous material and having rings 6 at each end of the tube to maintain the tube in a rigid position.

Fitted in each of the rings 6 at the ends of the tube is an imperforate cup 7, the cups being formed at diametrically opposite sides with outwardly pressed knobs 8 adapted for engagement in bayonet slots 9 formed in the rings 6 for detachably connecting the cups thereto.

Tightly fitted over the walls of the cups 7 are imperforate caps 10 having their ends spaced from the ends of the respective cups 7 to form air chambers 11 therein whereby to provide floats at each end of the device.

The cups 7 constitute measuring cups and the foraminous tube 5 may be supplied with a desired quantity of tea, coffee, or other beverage making substance and the cups 7 and caps 10 placed on the ends of the tube to close the latter and the container then placed in a suitable vessel 12 adapted to contain water 13 so that the beverage making container will float on the surface thereof as shown in Fig. 1 of the drawing.

One of the caps 10 is provided with an eye 13' to which a chain 14 is connected, the chain having a hook 15 at its free end adapted for engaging over the edge of the vessel to enable removal of the container without the fingers of a person coming into contact with the water therein.

The side of the tube 5 may be provided with a measuring gauge 16 adapted to indicate the quantity of material placed in the tube by teaspoonsful, tablespoonsful, or the like.

The float 10 at each end of the tubular container will support the latter on the surface of the water and when the water reaches a boiling temperature the container will roll and otherwise become agitated by the boiling water so that the contents thereof will be thoroughly and quickly subjected to the boiling water to quickly brew the beverage.

A tubular filter 17 of cloth or other suitable porous material may be placed in the tube 5, if desired, to prevent fine particles from becoming separated from the container and entering the water of the vessel.

It is believed the details of construction, operation and advantages of the device will be readily understood from the foregoing without further detailed explanation.

Having thus described the invention, what I claim is:

1. A beverage making container of the class described comprising a tubular member of foraminous material and adapted to contain the beverage making ingredients, and float members detachably connected at each end of said tubular member.

2. A beverage making container comprising a tubular member of foraminous material, measuring cups detachably connected to the ends of the member, and floats carried by said cups.

3. A beverage making container comprising a tubular member of foraminous material, measuring cups detachably connected to the ends of the member, and imperforate caps secured to the cups and forming floats for supporting the container horizontally on the surface of water in which the container is placed.

4. A beverage making container comprising an elongated, open-ended, tubular member of foraminous material, imperforate measuring cups detachably connected to and closing the ends of the tubular member, floats attachable to the cups at each end of the tubular member, and a contents-measuring gauge carried by said member and extending lengthwise thereon.

FRANKLIN J. DEVER.